Feb. 7, 1956  H. C. MORRIS  2,734,125
CLEARANCE LAMP
Filed Feb. 11, 1954
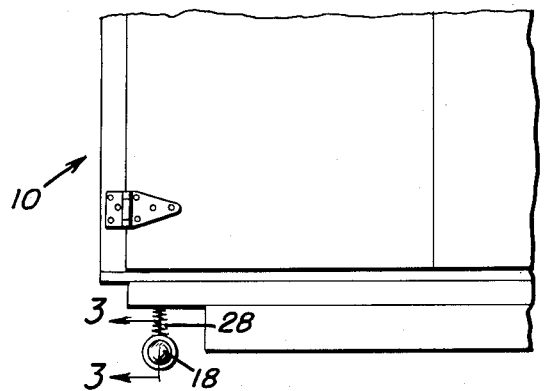
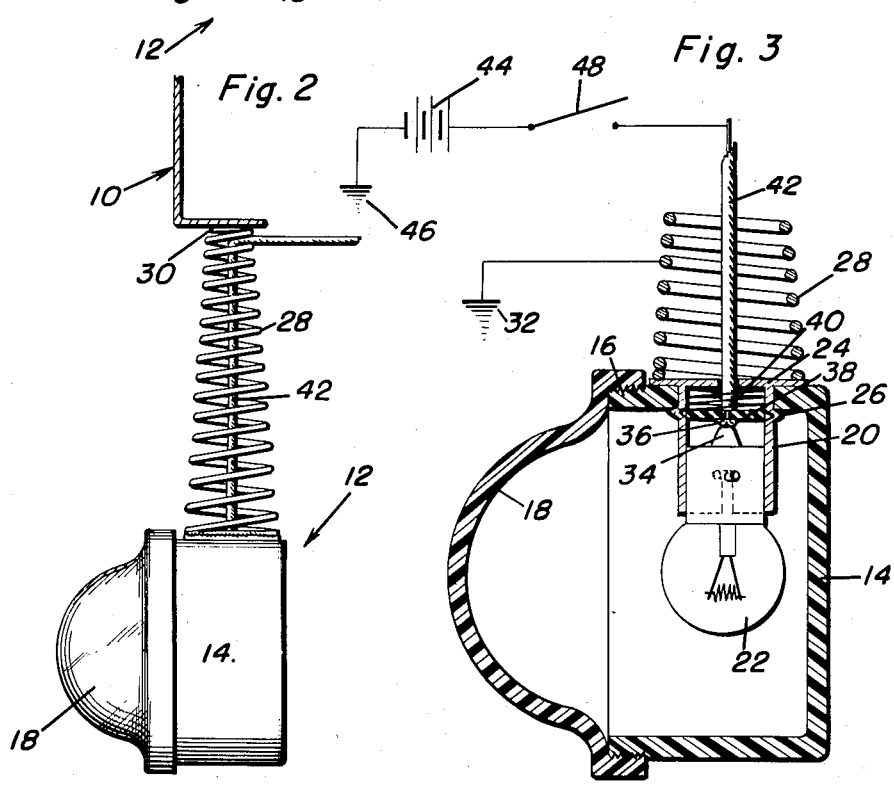
Harold C. Morris
INVENTOR.
BY *Clarence A. O'Brien*
*and Harvey B. Jacobson*
Attorneys

United States Patent Office 2,734,125
Patented Feb. 7, 1956

2,734,125

CLEARANCE LAMP

Harold C. Morris, Watsonville, Calif.

Application February 11, 1954, Serial No. 409,550

1 Claim. (Cl. 240—8.3)

This invention relates generally to a signal lamp for a vehicle and more particularly to a warning or clearance lamp of the type adapted to be mounted on the rear ends and sides of trucks, trailers, or the like, to provide an indication of the dimensions and shape of the vehicle on which they are mounted.

The primary object of the present invention resides in the provision of a lamp structure in which a flexible construction is provided between the body of the clearance lamp and the vehicle so that the clearance lamp may be resistant to damage upon contact with another object.

A further important object of the present invention resides in the provision of a vertical coil spring which resiliently mounts the clearance lamp. Within this coil spring, there extends the conductor which is connected to the battery or other source of electrical power of the vehicle.

Still another object of the invention resides in the provision of a clearance lamp which may be molded from a suitable electrically insulative and readily available material so as to provide a compact, highly attractive, yet substantially waterproof casing which is very light in weight and therefore capable of being easily attached to and suspended from the vehicle.

Still further objects and features of the invention reside in the provision of a clearance light that is strong and durable, simple in construction and manufacture, and which is capable of being produced at a relatively low cost, thereby permitting wide distribution.

These, together with the various ancillary objects and features of the invention which will become apparent as the following description proceeds, are attained by this clearance lamp, a preferred embodiment of which has been illustrated in the accompanying drawings, by way of example only, wherein:

Figure 1 is a rear elevational view illustrating the clearance lamp as mounted on a trailer body;

Figure 2 is a side elevational view of the clearance lamp; and

Figure 3 is an enlarged vertical sectional view as taken along the plane of line 3—3 in Figure 1.

With continuing reference to the accompanying drawings, wherein like reference numerals designate similar parts throughout the various views, reference numeral 10 generally designates the body of a truck, trailer, or other suitable vehicle. The clearance lamp comprising the present invention, which is generally designated by reference numeral 12, is adapted to be secured to the body 10 of the vehicle so as to provide an indication of the dimensions of the vehicle to another motorist, pedestrian, or other person at night to thereby prevent accidents from occurring.

The clearance lamp 12 comprises a body 14 of preferably molded insulative material such as any of the readily available synthetic plastic resins and is of cylindrical configuration, hollow, and provided with a threaded open side 16. A lens 18 is threadedly secured to the body 14 in threaded engagement with the open side 16 of the body 14.

Inserted within the body 14 and extending inside is a lamp socket 20 of the bayonet type. The lamp socket 20 is adapted to have a lamp 22 detachably secured thereto.

The lamp socket 20 includes an outer upper contact plate 24 of electrically conductive material which is positioned outwardly of the body 14, while the main portions of the socket 20 extend inside the body 14. A crimp 26 is formed in the lamp socket 20 after it is inserted into position to lock the lamp socket 20 in position.

A substantially conical coil spring 28 is welded or otherwise attached to the plate 24 and is also welded or otherwise affixed to the body 10 of the vehicle, as at 30. The coil spring 28 is grounded, as at 32.

The lamp 22 is electrically conducted to ground through the electrically conductive lamp socket 20 and through the contact plate 24 which is connected through the coil spring 28 to the ground 32.

The base 34 of the lamp 22 is in engagement with a contact 36 which is electrically conductive and which is mounted on an insulative plate 38 positioned within the lamp socket 20. A coil spring 40 continuously urges the plate 38 so that the contact 36 engages the base 34 of the lamp 22. Electrically connected to the contact 36 is a conductor 42 forming the hot wire connecting the lamp 22 with a source of electrical power, such as a battery 44 which is also grounded, as at 46. A switch 48 may be provided for controlling the flow of electrical power from the battery 44 to the lamp 22.

It is to be noted that the conductor 42 extends upwardly within the confines of the spring 28, thereby preventing the conductor 42 from becoming torn or broken unless the spring 28 were either to become permanently detached from the vehicle body 10 or from the body 14 of the lamp 12, thus assuring longer life for the assembly and more resistance to damage.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A clearance lamp adapted to be secured to a vehicle comprising an electrically insulative body of hollow cylindrical shape, a lamp socket secured in said body and having an upper conductive contact plate positioned outwardly of said body, a coil spring attached to said contact plate and adapted to be affixed to the vehicle to resiliently mount said clearance lamp, said coil spring being connected to ground, a lamp in said lamp socket electrically connected to ground through said lamp socket, said contact plate and said coil spring, and a conductor connected to said lamp connecting said lamp with a source of electrical power, said conductor extending upwardly within the confines of said coil spring, an insulative plate in said lamp socket, a contact member on said insulative plate, a resilient spring engaging said insulative plate urging said plate to engage said contact member with said lamp, said conductor being connected to said contact member, said body having an open threaded side, and a lens threadedly detachably secured to said threaded side of said body.

References Cited in the file of this patent

UNITED STATES PATENTS

| | | |
|---|---|---|
| 1,588,522 | Browne | June 15, 1926 |
| 1,707,003 | Geyser | Mar. 26, 1929 |
| 1,738,770 | Geyser | Dec. 10, 1929 |
| 2,069,238 | Fraser | Feb. 2, 1937 |
| 2,073,074 | Sauer | Mar. 9, 1937 |
| 2,081,703 | Germonprez | May 25, 1937 |
| 2,274,217 | Sauer | Feb. 24, 1942 |
| 2,341,360 | Bulgin | Feb. 8, 1944 |